(12) United States Patent
Harrison

(10) Patent No.: US 11,872,858 B2
(45) Date of Patent: *Jan. 16, 2024

(54) VEHICLE SUSPENSION ASSEMBLY AND METHOD

(71) Applicant: Eric Harrison, Royal Oak, MI (US)

(72) Inventor: Eric Harrison, Royal Oak, MI (US)

(*) Notice: Subject to any disclaimer, the term of this patent is extended or adjusted under 35 U.S.C. 154(b) by 8 days.

This patent is subject to a terminal disclaimer.

(21) Appl. No.: 17/242,936

(22) Filed: Apr. 28, 2021

(65) Prior Publication Data

US 2021/0245565 A1 Aug. 12, 2021

Related U.S. Application Data

(63) Continuation of application No. 16/286,013, filed on Feb. 26, 2019, now Pat. No. 11,021,029.

(60) Provisional application No. 62/636,435, filed on Feb. 28, 2018.

(51) Int. Cl.
 *F16F 1/04* (2006.01)
 *B60G 11/15* (2006.01)
 *B60G 11/26* (2006.01)

(52) U.S. Cl.
 CPC ............ *B60G 11/15* (2013.01); *B60G 11/265* (2013.01); *B60G 2202/12* (2013.01)

(58) Field of Classification Search
 CPC .. B60G 11/15; B60G 11/265; B60G 2202/12; F16F 1/04; F16F 1/06
 USPC ............... 267/70, 71, 73, 74, 157, 175, 177, 267/248–250, 252, 253
 See application file for complete search history.

(56) References Cited

U.S. PATENT DOCUMENTS

| | | | |
|---|---|---|---|
| 2,807,458 A | * | 9/1957 | Stephenson ............. F16F 1/041 267/157 |
| 2,902,274 A | | 9/1959 | Mcintyre |
| 3,229,951 A | | 1/1966 | Quick |
| 3,559,976 A | | 2/1971 | Jerz, Jr. |
| 3,572,678 A | | 3/1971 | Jerz, Jr. |
| 3,608,107 A | | 9/1971 | Kentor et al. |

(Continued)

FOREIGN PATENT DOCUMENTS

| | | |
|---|---|---|
| CN | 1099107 A | 2/1995 |
| CN | 1498785 A | 5/2004 |

(Continued)

OTHER PUBLICATIONS

Non final office action received for U.S. Appl. No. 16/286,013 dated Mar. 31, 2020, 20 pages.

(Continued)

*Primary Examiner* — Christopher P Schwartz
(74) *Attorney, Agent, or Firm* — Vorys, Sater, Seymour and Pease LLP; Mark A. Watkins

(57) ABSTRACT

Techniques regarding a vehicle suspension assembly are provided herein. For example, one or more embodiments described herein can regard an apparatus that can comprise a locking plate that can be located between a first spring and a second spring in a first direction. Also, the locking plate can comprise a locking pin. Moreover, the apparatus can comprise a locking sleeve that can surround the first spring and the locking plate. The locking sleeve can comprise a first channel that traverses the locking sleeve in the first direction. The locking sleeve can further comprise a second channel that is connected to the first channel and traverses the locking sleeve in a second direction.

20 Claims, 14 Drawing Sheets

(56) References Cited

U.S. PATENT DOCUMENTS

| | | |
|---|---|---|
| 4,355,563 A | 10/1982 | Swieskowski |
| 4,525,611 A | 6/1985 | Akamatsu et al. |
| 5,044,614 A | 9/1991 | Rau |
| 5,263,695 A | 11/1993 | Bianchi |
| 5,553,836 A | 9/1996 | Ericson |
| 5,711,514 A | 1/1998 | Lu |
| 5,803,443 A | 9/1998 | Chang |
| 5,961,106 A | 10/1999 | Shaffer |
| 5,996,982 A | 12/1999 | Bell |
| 6,676,118 B2 | 1/2004 | Chou |
| 6,698,721 B2 | 3/2004 | Martin |
| 6,902,045 B2 | 6/2005 | Oliver et al. |
| 7,270,222 B1 | 9/2007 | Aymar |
| 7,661,663 B2 | 2/2010 | Fritz et al. |
| 7,690,630 B2 | 4/2010 | Chun et al. |
| 7,744,062 B2 | 6/2010 | Dalluge |
| 7,891,645 B2 | 2/2011 | Schroeder |
| 8,317,003 B2 | 11/2012 | Michel |
| 8,844,943 B2 | 9/2014 | Kim et al. |
| 9,145,975 B2 | 9/2015 | Waterstredt |
| 9,162,548 B1 | 10/2015 | Wakeman |
| 9,162,578 B2 | 10/2015 | Venturi |
| 9,474,365 B2 | 10/2016 | Smith et al. |
| 9,599,199 B2 | 3/2017 | Graves |
| 9,682,604 B2 | 6/2017 | Cox et al. |
| 11,021,029 B2 * | 6/2021 | Harrison ............ B60G 17/005 |
| 2002/0171223 A1 | 11/2002 | Chan |
| 2005/0189685 A1 | 9/2005 | Verriet |
| 2006/0163787 A1 | 7/2006 | Munster et al. |
| 2007/0182079 A1 | 8/2007 | Fang |
| 2007/0267791 A1 | 11/2007 | Hollander et al. |
| 2008/0099968 A1 * | 5/2008 | Schroeder ............. F16F 3/04 267/179 |
| 2009/0302559 A1 | 12/2009 | Doerfel |
| 2010/0252972 A1 | 10/2010 | Cox et al. |
| 2010/0308518 A1 | 12/2010 | Michel |
| 2011/0291338 A1 | 12/2011 | Pepka |
| 2012/0104704 A1 | 5/2012 | Nguyen |
| 2012/0286462 A1 | 11/2012 | Pepka |
| 2016/0152107 A1 | 6/2016 | Ranjan et al. |
| 2017/0253102 A1 | 9/2017 | Mason |

FOREIGN PATENT DOCUMENTS

| | | | |
|---|---|---|---|
| CN | 2844566 Y | 12/2006 | |
| CN | 101323236 A | 12/2008 | |
| CN | 201236918 Y | 5/2009 | |
| CN | 201258935 Y | 6/2009 | |
| CN | 101559703 A | 10/2009 | |
| CN | 103291792 A | 9/2013 | |
| CN | 104315074 A | 1/2015 | |
| CN | 104930096 A | 9/2015 | |
| CN | 104948624 A | 9/2015 | |
| CN | 204664244 U | 9/2015 | |
| CN | 204784355 U | 11/2015 | |
| CN | 105422703 A | 3/2016 | |
| CN | 105667239 A | 6/2016 | |
| CN | 106151335 A | 11/2016 | |
| CN | 206092772 U | 4/2017 | |
| CN | 108215699 A * | 6/2018 | ............ B60G 11/14 |
| DE | 3714363 A1 | 11/1987 | |
| DE | 20308838 U1 | 8/2003 | |
| DE | 102009017352 A1 | 10/2010 | |
| DE | 102015207316 A1 | 10/2016 | |
| EP | 1 479 542 A2 | 11/2004 | |
| FR | 2652783 A1 | 4/1991 | |
| FR | 2664210 A1 | 1/1992 | |
| FR | 2697436 A1 | 5/1994 | |
| FR | 3017337 A1 | 8/2015 | |
| KR | 20080051970 A | 6/2008 | |
| KR | 20140056632 A | 5/2014 | |
| WO | 9104876 A1 | 4/1991 | |

OTHER PUBLICATIONS

Final office action received for U.S. Appl. No. 16/286,013 dated Sep. 28, 2020, 7 pages.

* cited by examiner

- 1402: ROTATING A LOCKING SLEEVE AROUND A LOCKING PLATE OF A SUSPENSION ASSEMBLY
- 1404: RELOCATING A POSITION OF A LOCKING PIN OF THE LOCKING PLATE RELATIVE TO THE LOCKING SLEEVE TO INHIBIT COMPRESSION OF A SPRING COMPRISED WITHIN THE SUSPENSION ASSEMBLY, WHEREIN THE LOCKING SLEEVE COMPRISES A FIRST CHANNEL THAT TRAVERSES THE LOCKING SLEEVE ALONG A COMPRESSION DIRECTION OF THE SPRING AND A SECOND CHANNEL THAT IS CONNECTED TO THE FIRST CHANNEL AND TRAVERSES THE LOCKING SLEVE IN A SECOND DIRECTION, AND WHEREIN THE RELOCATING COMPRISES MOVING THE LOCKING PIN FROM A FIRST POSITION WITHIN THE FIRST CHANNEL TO A SECOND POSITION WITHIN THE SECOND CHANNEL

- 1408: ROTATING A LOCKING PIN WITHIN A LOCKING SLEEVE OF A SUSPENSION ASSEMBLY
- 1410: RELOCATING A POSITION OF A LOCKING PIN OF THE LOCKING PLATE RELATIVE TO THE LOCKING SLEEVE TO INHIBIT COMPRESSION OF A SPRING COMPRISED WITHIN THE SUSPENSION ASSEMBLY, WHEREIN THE LOCKING SLEEVE COMPRISES A FIRST CHANNEL THAT TRAVERSES THE LOCKING SLEEVE ALONG A COMPRESSION DIRECTION OF THE SPRING AND A SECOND CHANNEL THAT IS CONNECTED TO THE FIRST CHANNEL AND TRAVERSES THE LOCKING SLEVE IN A SECOND DIRECTION, AND WHEREIN THE RELOCATING COMPRISES MOVING THE LOCKING PIN FROM A FIRST POSITION WITHIN THE FIRST CHANNEL TO A SECOND POSITION WITHIN THE SECOND CHANNEL

VEHICLE SUSPENSION ASSEMBLY AND METHOD

BACKGROUND

The subject disclosure is directed to a vehicle suspension assembly and use thereof, and more specifically, a vehicle suspension system rotary locking sleeve to achieve various performance characteristics.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, apparatuses and/or methods that regard a vehicle suspension assembly are described.

According to an embodiment, an apparatus is provided. The apparatus can comprise a locking plate that can be located between a first spring and a second spring in a first direction. Also, the locking plate can comprise a locking pin. Moreover, the apparatus can comprise a locking sleeve that can surrounds the first spring and the locking plate. The locking sleeve can comprise a first channel that traverses the locking sleeve in the first direction. The locking sleeve can further comprise a second channel that is connected to the first channel and traverses the locking sleeve in a second direction.

According to another embodiment, a system is provided. The system can comprise a locking plate located between a first spring and a second spring. The locking plate can comprise a locking pin. The system can further comprise a locking sleeve that can be operatively coupled to an actuator. The locking sleeve can at least partially surround the first spring and the locking plate. The system can also comprise a first channel that can traverse the locking sleeve in a compression direction of the first spring. Moreover, the system can comprise a second channel that can traverse the locking sleeve in a second direction.

According to another embodiment, a method is provided. The method can comprise relocating a position of a locking pin relative to a locking sleeve to inhibit compression of a spring that is comprised within a suspension assembly. Also, the locking sleeve can comprise a first channel that can traverse the locking sleeve along a compression direction of the spring and a second channel that can be connected to the first channel and can traverse the locking sleeve in a second direction. The method can also comprise moving the locking pin from a first position within the first channel to a second position within the second channel.

BRIEF DESCRIPTION OF THE DRAWINGS

FIG. 14A illustrates a flow diagram of an example, non-limiting method that can facilitate using a rotating locking mechanism in a suspension assembly in accordance with one or more embodiments described herein.

FIG. 14B illustrates a flow diagram of an example, non-limiting method that can facilitate using a rotating locking mechanism in a suspension assembly in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As vehicles travel along roadways, they can be subjected to various forms of shock due to road-top conditions (e.g., uneven pavement, potholes, debris, and/or the like). Thus, many vehicles utilize suspension systems to dampen the effects felt by said forms of shock. Conventional suspension systems can comprise one or more springs that can compress and/or expand in response to one or more stresses (e.g., shocks) exhibited by a vehicle. In conventional systems, actuation of the one or more springs can be controlled via pistons, hydraulics, electro-magnets, and/or the like in order to provide a plethora of performance options. However, while various performance options are preferable, the complexity of the actuation systems that provide said performance can often lead to unreliability, difficult maintenance, and/or costly installation.

Various embodiments described herein regard a suspension assembly that can achieve various performance characteristics while utilizing a mechanical locking system that can be more reliable, easier to maintain, and/or less costly than alternative systems. For example, one or more embodiments can comprise a locking sleeve that can rotate around a central axis of the suspension assembly and engage and/or disengage with a locking pin, thereby adjusting suspension performance and/or vehicle height characteristics.

Figure 1:
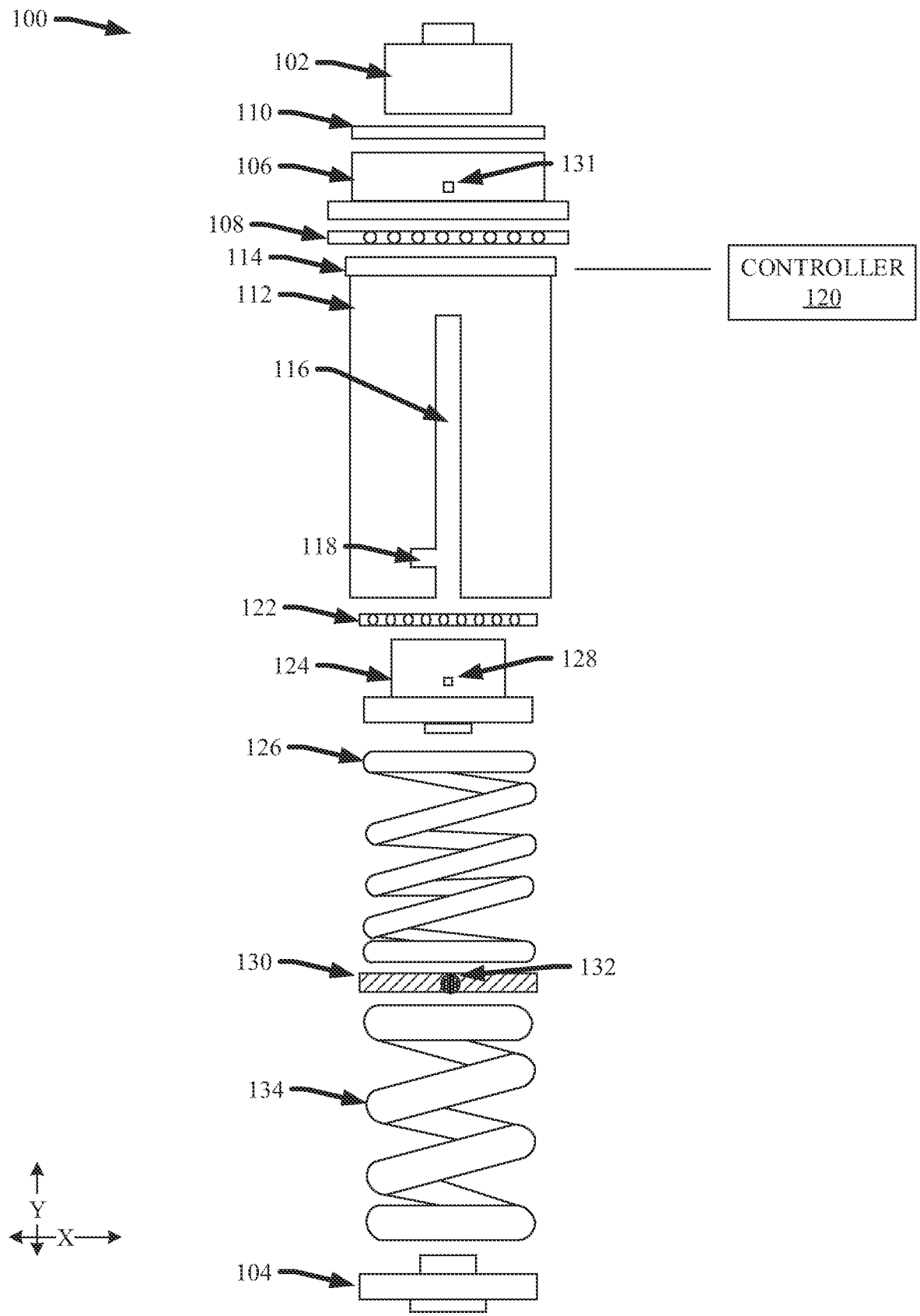
FIG. 1 illustrates a diagram of an example, non-limiting exploded view of a suspension assembly in accordance with one or more embodiments described herein.

FIG. 1 illustrates a diagram of an example, non-limiting exploded view of a suspension assembly 100 in accordance with one or more embodiments described herein. The suspension assembly 100 can be utilized with a variety of vehicles to lessen the effects of stresses that the vehicle may be subject to, such as shock from poor road conditions. As used herein, the term "vehicle" can refer to any apparatus designed to transport an individual and/or object from one location to another. Example vehicles can include, but are not limited to: an automobile (e.g., cars, trucks, vans, sports utility vehicles (SUV), jeeps, combustible engine automobiles, electric automobiles, hybrid automobiles, a combination thereof, and/or the like), a cart, a trailer, a wagon, machinery (e.g., tractors, blows, carbines, heavy machinery), a scooter, a bicycle, a motorcycle, a plane, a combination thereof, and/or the like. For instance, the suspension assembly 100 can be attached to a chassis of a subject vehicle and can dampen forces cause by ground obstacles encountered by the vehicle (e.g., uneven payment, potholes, and/or the like).

The suspension assembly 100 can comprise a first mounting bracket 102 located at a first distal end of the suspension assembly 100, and a second mounting bracket 104 located at a second distal end of the suspension assembly 100. The first distal end and the second distal end can be opposite each other such that the first mounting bracket 102 comprises a first end of the suspension assembly 100 and the second mounting bracket 104 comprises a second end of the suspension assembly 100. The first mounting bracket 102 and the second mounting bracket 104 can facilitate attachment of the suspension assembly 100 to a vehicle. For example, wherein the vehicle is an automobile, the first mounting bracket 102 can be mounted to a chassis of the vehicle while the second mounting bracket 104 can be mounted to and/or near a lower control arm, knuckle, and/or axle mount of the vehicle. A plurality of suspension assemblies 100 can be mounted to a single vehicle.

One of ordinary skill in the art will recognize that the first mounting bracket 102 and the second mounting bracket 104 can be fixed to a subject vehicle via a variety of techniques. For example, the first mounting bracket 102 and the second mounting bracket 104 can be bolted and/or welded to the vehicle. In another example, the first mounting bracket 102 can be accepted by a mounting port located on the vehicle, and the second mounting bracket 104 can likewise be accepted by another mounting port located elsewhere on the vehicle. The mounting bracket 102 can also be the fixed end of a shock absorber or automotive damper, which can be threaded to accept the inner spring cap 124.

Between the first mounting bracket 102 and the second mounting bracket 104, an outer spring cap 106 can be position between the first mounting bracket 104 and a first rotary bearing 108 (e.g., a thrust bearing). Additionally, an adjustment disk 110 can be located between the first mounting bracket 102 and the outer spring cap 106. The adjustment disk 110 can facilitate a ride height adjustment of a subject vehicle attached to the suspension assembly 100. For example, the first mounting bracket 102 can be threaded on its outer surface and the adjustment disk can comprise matching threading on an inner surface. As the length of the suspension assembly 100 changes (e.g., as described later herein) the adjustment disk can up and/or down the first mounting bracket 102 via the threading and lock into one or more different positions.

The first rotary bearing 108 (e.g., a thrust bearing) can be located between the outer spring cap 106 and a locking sleeve 112. The rotary bearing 108 can enable the locking sleeve 112 to rotate around a center axis of the suspension assembly 100, while the outer spring cap 106 and/or the first mounting bracket 102 can remain stationary.

The locking sleeve 112 can comprise one or more actuators 114, one or more first channels 116, and/or one or more second channels 118. Example materials that can comprise the locking sleeve 112 include, but are not limited to: stainless steel, a polymer, carbon fiber, titanium, a combination thereof, and/or the like. For instance, the locking sleeve 112 can be made from one or more materials that can be rigid, durable, and/or corrosion resistant. The one or more actuators 114 can be fixed to the locking sleeve 112 and facilitate rotating the locking sleeve 112 around the center axis. For example, the one or more actuators 114 can be rotary actuators. The one or more actuators 114 can be operably coupled to one or more controllers 120. The one or more controllers 120 can control performance of the one or more actuators 114. For example, the one or more controllers 120 can initiate and/or halt operation of the one or more actuators 114. In another example, the one or more controllers 120 can dictate a speed at which the one or more actuators 114 operate. In one or more embodiments, the one or more controllers 120 can be computerized and comprise one or more processors (e.g., a central processing unit "CPU").

Housed within the locking sleeve 112, the suspension assembly 100 can further comprise a second rotary bearing 122, an inner spring cap 124, and/or a first spring 126. The inner spring cap 124 can comprise one or more first locking mechanisms 128 that can engage with a respective second locking mechanism 131 of the outer spring cap 106. While one first locking mechanism 128 and one second locking mechanism 131 are shown in FIG. 1, the architecture of the outer spring cap 106 and/or the inner spring cap 124 is not so limited. For example, the inner spring cap 124 can comprise two or more first locking mechanisms 128 and/or the outer spring cap 106 can comprise two or more second locking mechanisms 131. The spring cap 124 can also be fixed to the mounting bracket 102 via a variety of means, which can include, but are not limited to: screwing, bolting, welding, an adhesive, a combination thereof, and/or the like. In one or more alternative embodiments (not shown), the inner spring cap 124 can be fixed (e.g., screwed via matching threads) directly on to the upper bracket 102 without the need for the outer spring cap 106 and/or the outer spring cap's 106 associate features (e.g., second locking mechanism 131). For example, the mounting bracket 102 can be the fixed end of a shock absorber and/or damper, wherein the mounting bracket 102 and/or the inner spring cap 124 can comprise complimentary threading such that the inner spring cap 124 can be screwed directly onto the mounting bracket 102.

The first spring 126 can be located between the inner spring cap 124 and a locking plate 130. The second rotary bearing 122 can surround a portion of the inner spring cap 124. The locking plate 130 can be made of, for example, a metal (e.g., titanium, steel, iron, aluminum, an alloy, a combination thereof, and/or like) and/or a plastic. For instance, the locking plate 130 can be made from a low friction material such as a polished metal (e.g., polished steel). Further, the locking plate 130 can comprise one or more locking pins 132. A second spring 134 can be located between the locking plate 130 and the second mounting bracket 104. The first spring 126 can have a first spring rate, and the second spring 134 can have a second spring rate. In one or more embodiments, the first spring rate can be less than the second spring rate. In one or more other embodiments, the first spring rate can be greater than the second spring rate.

As shown in FIG. 1, the first spring 126 and the second spring 134 can be positioned end-to-end length-wise along a center axis of the suspension assembly 100, wherein the locking plate 130 can separate an end of the first spring 126 and an adjacent end of the second spring 134. Further, as shown in FIG. 1, the "Y" axis can represent a compression direction of the first spring 126 and/or the second spring 134. As force is applied to the first mounting bracket 102 and/or the second mounting bracket 104 along the "Y" axis, the first spring 126 and/or the second spring 134 can compress.

Figure 2:
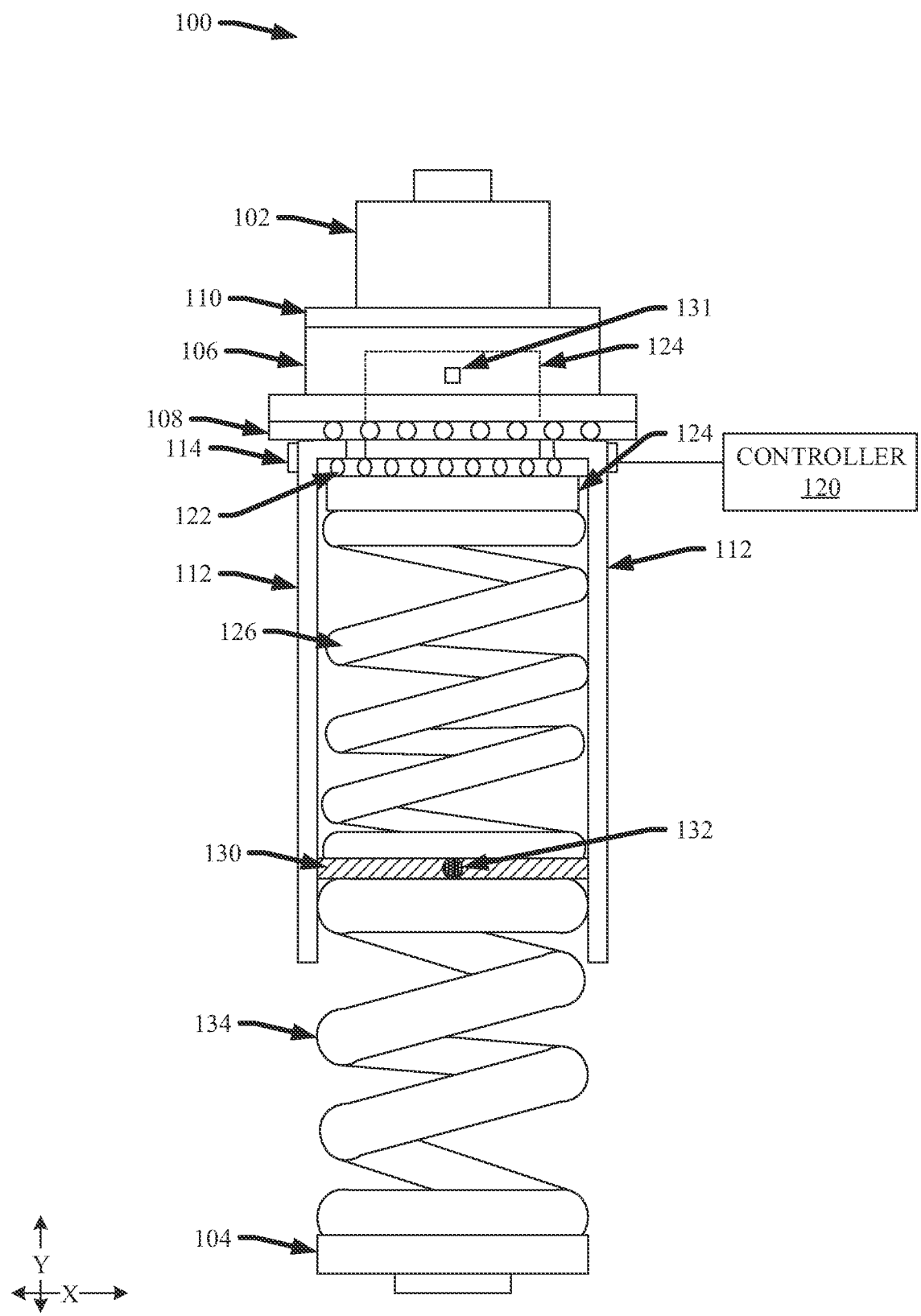
FIG. 2 illustrates a diagram of an example, non-limiting side view of a suspension assembly absent a cross-section of a locking sleeve that comprises the suspension assembly in accordance with one or more embodiments described herein.

FIG. 2 illustrates a diagram of an example, non-limiting side view of the suspension assembly 100 with a cross-section of the locking sleeve 112 removed. Repetitive description of like elements employed in other embodiments described herein is omitted for sake of brevity.

As shown in FIG. 2, the first mounting bracket 102 can be attached to and/or otherwise interact with the adjustment disk 110 via matching threading. Additionally, a side of the adjustment disk 110 can be fixed to the outer spring cap 106. One of ordinary skill in the art will recognize that the adjustment disk 110 can be fixed to the outer spring cap 106 via a variety of means, which can include, but are not limited to: screwing, bolting, welding, an adhesive, a combination thereof, and/or the like. The first rotary bearing 108 can be held in place due to the structure of the suspension assembly. Also, the outer spring cap 106 can further be fixed to a first side of the first rotary bearing 108 (e.g., a thrust bearing). A second side of the rotary bearing 108 can be fixed to an outside of the locking sleeve 112. One of ordinary skill in the art will recognize that the first rotary bearing 108 can be fixed to the outer spring cap 106 and/or the outside of the locking sleeve 112 via a variety of means, which can include, but are not limited to: screwing, bolting, welding, an adhesive, a combination thereof, and/or the like.

The outer spring cap 106 can comprise a hollow cavity; the first rotary bearing 108 can comprise a center hole; a top of the locking sleeve 112 can also comprise a center hole; and the second rotary bearing 122 can comprise a further center hole. As shown in FIG. 2, the inner spring cap 124 can be housed within the locking sleeve 112 and extend: through the second rotary bearing's 122 center hole, through the locking sleeve's 112 center hole, through the first rotary bearing's 108 center hole, and into the outer spring cap's 106 cavity. Within the outer spring cap's 106 cavity, the inner spring cap 124 can be fixed to the outer spring cap 106 via the one or more first locking mechanisms 128 and/or the one or more second locking mechanisms 131. For example, one or more rods (not shown) can extend through the one or more second locking mechanisms 131 and into the one or more first locking mechanisms 128. Extension of the inner spring cap 124 into the outer spring cap 106 is illustrated in FIG. 2 with dotted lines.

The second rotary bearing 122 (e.g., a thrust bearing) can be fixed to an inside of the locking sleeve 112 and/or the inner spring cap 124. One of ordinary skill in the art will recognize that the second rotary bearing 122 can be fixed to the inside of the locking sleeve 112 and/or the inner spring cap 124 via a variety of means, which can include, but are not limited to: screwing, bolting, welding, an adhesive, a combination thereof, and/or the like. Thus, a top portion of the locking sleeve 112 can be positioned between the first rotary bearing 108 and/or the second rotary bearing 122. Further, an outside surface of the locking sleeve's 112 top portion can be fixed to the first rotary bearing 108 while an inside surface of the locking sleeve's 112 top portion can be fixed to the second rotary bearing 122.

A first end of the first spring 126 can be fixed to the inner spring cap 124 and a second end of the first spring 126 can be fixed to the locking plate 130. The first spring 126 can be fixed to the inner spring cap 124 and/or the locking plate 130 via permanent and/or temporary means. For example, the first spring 126 can be fixed to the inner spring cap 124 and/or the locking plate 130 via a variety of means, which can include, but are not limited to: screwing, bolting, welding, an adhesive, a combination thereof, and/or the like.

A first end of the second spring 134 can be fixed to the locking plate 130 and a second end of the second spring 134 can be fixed to the second mounting bracket 104. The second spring 134 can be fixed to the locking plate 130 and/or the second mounting bracket 104 via permanent and/or temporary means. For example, the second spring 134 can be fixed to the locking plate 130 and/or the second mounting bracket 104 via a variety of means, which can include, but are not limited to: screwing, bolting, welding, an adhesive, a combination thereof, and/or the like.

In one or more embodiments, the first rotary bearing 108, the locking sleeve 112, and/or the second rotary bearing 122 can be fixed into place via the interaction between the outer spring cap 106 and the inner spring cap 124 (e.g., through the one or more first locking mechanisms 128 and/or the one or more second locking mechanisms 131). In other words, the first rotary bearing 108, the locking sleeve 112, and/or the second rotary bearing 122 can be sandwiched between the outer spring cap 106 and/or the inner spring cap 124. In one or more other embodiments, the first rotary bearing 108 can be fixed (e.g., bolted) to the outer spring cap 106 and/or the locking sleeve 112 can be fixed (e.g., bolted) to the rotary bearing 108; thereby rendering the second rotary bearing 122 and/or the inner spring cap 124 optional.

Due to the locking sleeve's 112 fixation to the first rotary bearing 108 and/or the second rotary bearing 122, the locking sleeve 112 can rotate along a center axis of the suspension assembly 100 around the second rotary bearing 122, a portion of the inner spring cap 124, the first spring 126, the locking plate 130, and/or a portion of the second spring 134. Said rotation can be facilitated by the one or more actuators 114 and/or controlled by the one or more controllers 120. In contrast, rotation of the first mounting bracket 102, the second mounting bracket 104, the outer spring cap 106, the adjustment disk 110, the inner spring cap 124, the first spring 126, the locking plate 130, the one or more locking pins 132, and or the second spring 134 can be inhibited. For example, fixation to the vehicle can inhibit rotation of the first mounting bracket 102 and/or the second mounting bracket 104. Fixation to the first mounting bracket 102 can inhibit rotation of the washer 110 and/or the outer spring cap 106. Fixation to the outer spring cap 106 (e.g., via the one or more first locking mechanisms 128 and/or the one or more second locking mechanisms 131) can inhibit rotation of the inner spring cap 124. Fixation to the inner spring cap 124 can inhibit rotation of the first spring 126. Fixation to the first spring 126 can inhibit rotation of the locking plate 130. Further, rotation of the locking plate 130 can be inhibited by fixation to the second spring 134, which can have its rotation inhibited by fixation to the second mounting bracket 104. In one or more embodiments, the suspension assembly 100 can further comprise a central guide rod (not shown). The guide rod can be located along the "Y" axis. Further, the guide rod can be surrounded by the first spring 126 and/or the second spring 134. Moreover, the guide rod can be fixed to the inner spring cap 124, the locking plate 130, and/or the second mounting bracket 104. Thus, the guide rod can provide further mechanical stability to the locking plate 130 and facilitate locking plate 130 in resisting rotation.

Thus, while the locking sleeve 112 can rotate around the 'Y' axis, the position of the one or more locking pins 132 along the 'X' axis remains constant. While the subject figures illustrate the locking plate 130 comprising one locking pin 132, the architecture of the locking plate 130 is not so limited. For example, the locking plate 130 can comprise two or more locking pins 132. The one or more locking pins 132 can be positioned along a periphery of the locking plate 130 and can extend away from the center axis of the suspension assembly 100. Additionally, the one or more locking pins 132 can have a variety of shapes, including, but not limited to: a cylindrical shape, a triangular shape, a polygonal shape, a combination thereof, and/or the like. Moreover, all of the one or more locking pins 132 can have the same shape and/or respective locking pins 132 can have different shapes. Additionally, the one or more locking pins 132 can comprise rollers (e.g., ball bearings) to reduce friction between the one or more locking pins 132 and the locking sleeve 112.

Figure 3:
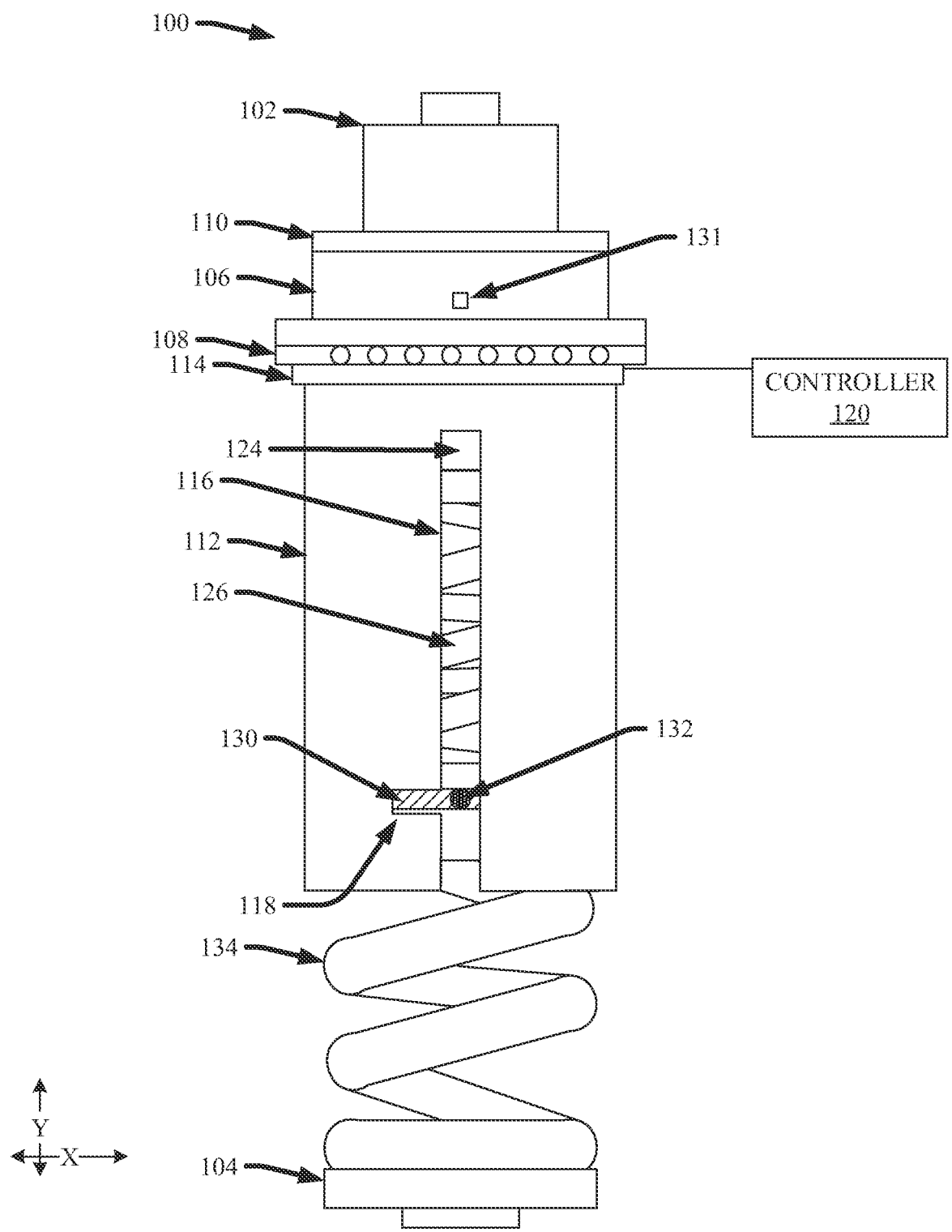
FIG. 3 illustrates a diagram of an example, non-limiting side view of a suspension assembly in accordance with one or more embodiments described herein.

FIG. 3 illustrates a diagram of an example, non-limiting side view of the suspension assembly 100 in an unlocked state in accordance with one or more embodiments described herein. Repetitive description of like elements employed in other embodiments described herein is omitted for sake of brevity. While in an unlocked state, the first spring 126 can compress and/or expand along the "Y" axis (e.g., the compression direction).

As shown in FIG. 3, the one or more first channels 116 can traverse the locking sleeve 112 along the "Y" axis (e.g., along the compression direction). Additionally, one or more of the first channels 116 can be connected to one or more second channels 118. The one or more second channels 118 can traverse the locking sleeve 112 along a second direction (e.g., along the "X" axis), which can be orthogonal to the compression direction. While FIG. 3 shows one first channel 116 and one second channel 118, the architecture of the locking sleeve 112 is not so limited. For example, the locking sleeve 112 can comprise two or more (e.g., 2-100) first channels 116 and/or two or more (e.g., 2-100) second channels 118.

The one or more first channels 116 and/or the one or more second channels 118 can extend through the thickness of the locking sleeve 112. The one or more first channels 116 can correspond to a respect locking pin 132. In an unlocked state, as shown in FIG. 3, the locking sleeve 112 can be positioned (e.g., via the one or more actuators 114 and/or the controller 120) such that the one or more locking pins 132 are within a respective first channel 116. Within the one or more first channels 116, the one or more locking pins 132 can extend into and/or through the locking sleeve 112.

As the suspension assembly 100 is subject to pressure along the "Y" axis, the first spring 126, and/or the second spring 134, can compress or expand along the "Y" axis (e.g., the compression direction). As the first spring 126 compresses or expands, the locking plate 130 can move along the "Y" axis (e.g., along the compression direction). Movement of the locking plate 130 along the "Y" axis can be unimpeded by the locking sleeve 112, despite the one or more locking pins 132 extending into and/or through the locking sleeve 112, at least because the one or more first channels 116 can define a guide path for the one or more locking pins 132 that is free from obstruction. In other words, the locking plate 130 is free to move along the "Y" axis, and thereby the first spring 126 can be free to compress and/or extend along the "Y" axis, so long as the locking sleeve 112 is positioned such that the one or more locking pins 132 are within the one or more first channels 116 (e.g., as shown in FIG. 3).

Figure 4:
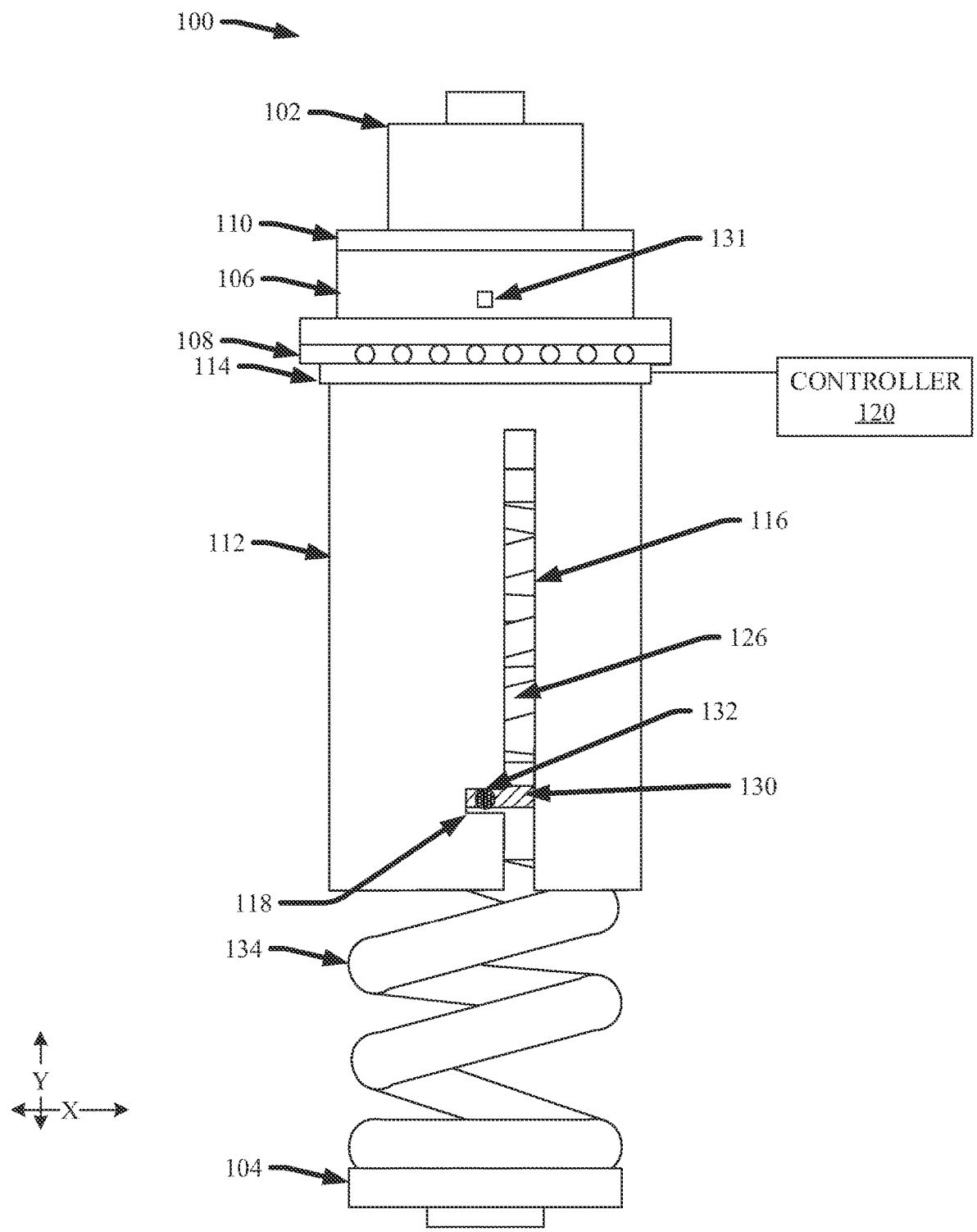
FIG. 4 illustrates a diagram of an example, non-limiting side view of a suspension assembly in a locked position in accordance with one or more embodiments described herein.

FIG. 4 illustrates a diagram of an example, non-limiting side view of the suspension assembly 100 in a first locked state in accordance with one or more embodiments described herein. Repetitive description of like elements employed in other embodiments described herein is omitted for sake of brevity. While in the first locked state, compression and/or extension of the first spring 126 along the "Y" axis (e.g., the compression direction) can be inhibited by the locking sleeve 112.

As shown in FIG. 4, to achieve the first locked state, the locking sleeve 112 can be rotated (e.g., via the one or more actuators 114 and/or the one or more controllers 120) from its position in the unlocked state such that one or more locking pins 132 are positioned within one or more second channels 118. The one or more second channels 118 can be connected to a respective first channel 116, thereby enabling the one or more locking pins 132 to transition between the one or more first channels 116 and/or the one or more second channels 118 in response to the locking plate 130 being in a certain position along the "Y" axis (e.g., determined by compression of the first spring 126) and/or the locking sleeve 112 rotating.

In FIG. 4, the one or more second channels 118 can extend from the one or more first channels 116 in a left direction across the locking sleeve 112, and the locking sleeve 112 can be rotated in a counter clock-wise direction to achieve the first locked state. However, the architecture of the locking sleeve 112 is not so limited. For example, the one or more second channels 118 can extend from the one or more first channels 116 in a right direction across the locking sleeve 112, and the locking sleeve 112 can be rotated in a clockwise direction to achieve the first locked state.

In the first locked state, the one or more locking pins 132 can extend into and/or through the locking sleeve 112 via the one or more second channels 118. Further, the respective sides of the one or more second channels 118 can inhibit the one or more locking pins 132 within the subject second channel 118 from moving along the "Y" axis. Thus, so long as the one or more locking pins 132 are located within the one or more second channels 118, the position of the locking plate 130 can be locked along the "Y" axis to the "Y" axis position of the one or more second channels 118. In response to the locking plate 130 being locked along the "Y" axis, the first spring 126 can likewise be locked, wherein compression of the first spring 126 along the "Y" axis can be impeded.

While in the first locked state, as force is applied to the suspension assembly 100 along the "Y" axis, the rigid structure of the locking sleeve 112 in conjunction with the one or more locking pins 132 can disengage the first spring 126; thereby inhibiting the first spring 126 from compressing and/or extending along the "Y" axis. However, compression and/or extension of the second spring 134 can remain uninhibited by the locking sleeve 112, even in the first locked state. Therefore, in the first locked state, the first spring 126 can be disengaged while the second spring 134 can be engaged; whereas in the unlocked state, the first spring 126 and the second spring 134 can both be engaged. Wherein the second spring 134 has a higher spring rate than the first spring 126, the first locked state can render a stiffer performance characteristic than the unlocked state.

Figure 5:
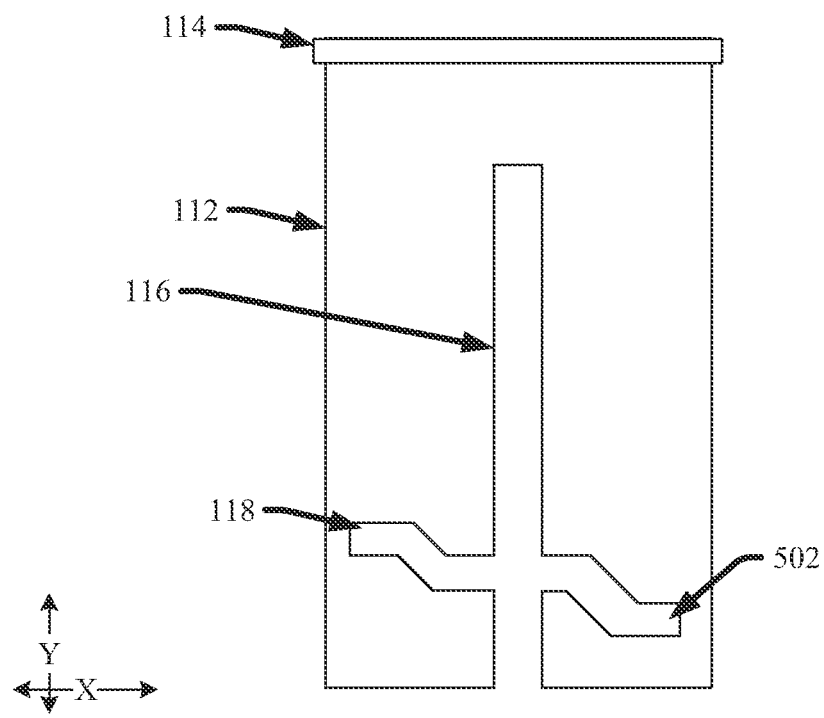
FIG. 5 illustrates a diagram of an example, non-limiting locking sleeve that can be utilized with a suspension assembly in accordance with one or more embodiments described herein.

FIG. 5 illustrates a diagram of an example, non-limiting locking sleeve 112 that can assist the suspension assembly 100 in achieving the unlocked state, the first locked state, a second locked state, and/or a third locked state in accordance with one or more embodiments described herein. Repetitive description of like elements employed in other embodiments described herein is omitted for sake of brevity. In one or more embodiments, the locking sleeve 112 can further comprise one or more third channels 502. The one or more third channels 502 can extend through the thickness of the locking sleeve 112 and can provide a guidance path for one or more locking pins 132.

As shown in FIG. 5, the one or more second channels 118 can extend from the one or more first channels 116 across various positions along the "Y" axis. For example, a subject second channel 118 can extend from a first end, which can be connected to a subject first channel 116, to a distal second end; wherein the distal second end can be located nearer, along the "Y" axis, to the top of the locking sleeve 112 than the first end. Thus, a locking pin 132 traveling within the subject second channel 118 can achieve various positions along the "Y" axis.

Likewise, the one or more third channels 502 can extend from the one or more first channels 116 across various positions along the "Y" axis. For example, a subject third channel 502 can extend from a first end, which can be connected to a subject first channel 116, to a distal second end; wherein the distal second end can be located further, along the "Y" axis, from the top of the locking sleeve 112 than the first end. Thus, a locking pin 132 traveling within the subject third channel 502 can achieve various positions along the "Y" axis.

Figure 6:
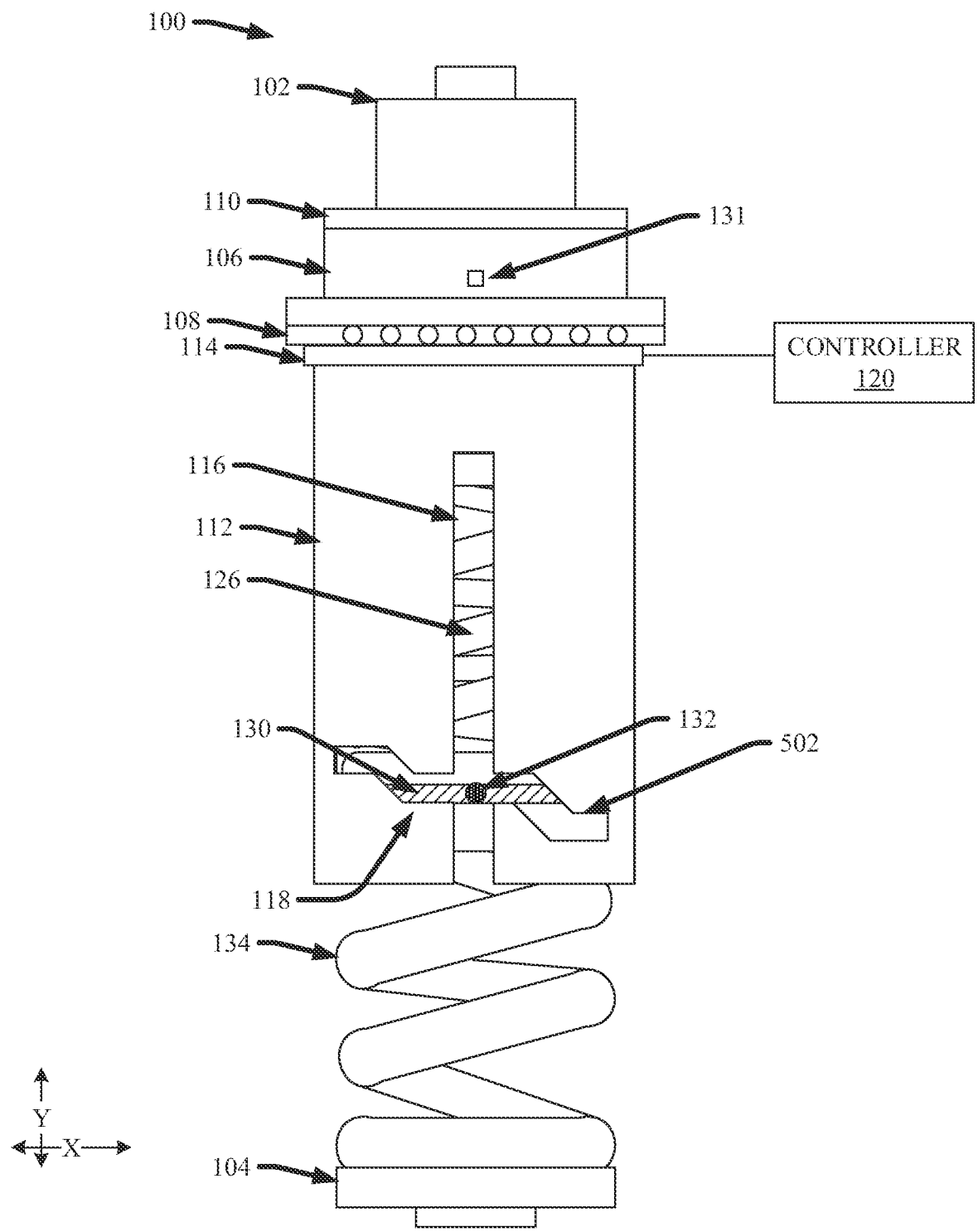
FIG. 6 illustrates a diagram of an example, non-limiting side view of a suspension assembly is an unlocked position in accordance with one or more embodiments described herein.

FIG. 6 illustrates a diagram of the example, non-limiting suspension assembly 100 in the unlocked state and comprising a locking sleeve 112 that can include the one or more first channels 116, the one or more second channels 118, and/or the one or more third channels 502 in accordance with one or more embodiments described herein. Repetitive description of like elements employed in other embodiments described herein is omitted for sake of brevity.

FIG. 6 illustrates that a locking sleeve 112 comprising one or more third channels 502 (e.g., as shown in FIG. 5) can facilitate the unlocked state also shown in FIG. 3. In particular, even when the locking sleeve 112 comprises one or more third channels 502, the locking sleeve 112 can be positioned (e.g., via the one or more actuators 114 and/or the one or more controllers 120) such that the one or more locking pins 132 are located within the one or more first channels 116. Thus, the one or more locking pins 132, the locking plate 130, and/or the first spring 126 are free to travel along the "Y" axis, guided by the one or more first channels 116.

Figure 7:
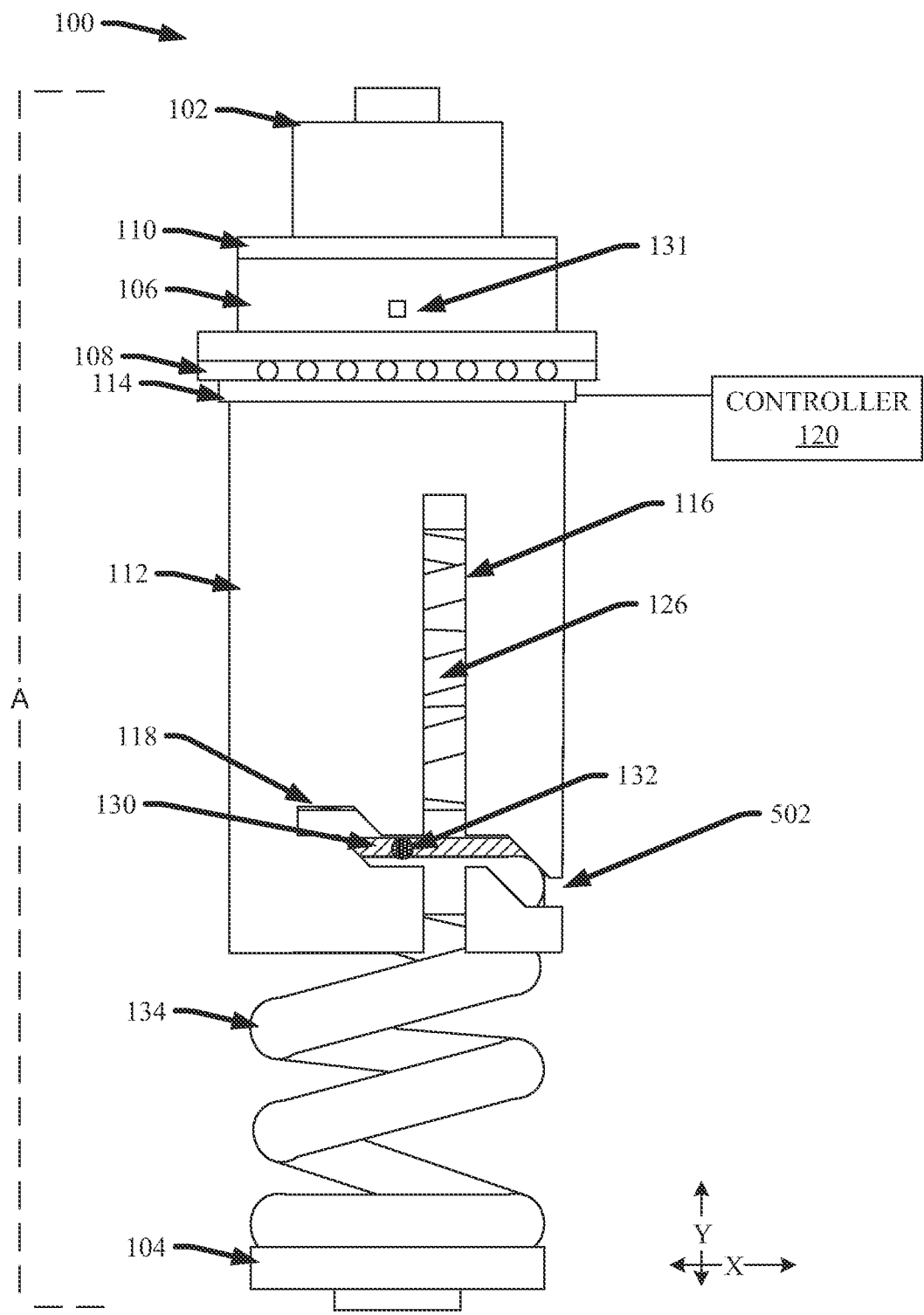
FIG. 7 illustrates a diagram of an example, non-limiting side view of a suspension assembly is a first locked position in accordance with one or more embodiments described herein.

FIG. 7 illustrates a diagram of the example, non-limiting suspension assembly 100 in the first locked state and comprising a locking sleeve 112 that can include the one or more first channels 116, the one or more second channels 118, and/or the one or more third channels 502 in accordance with one or more embodiments described herein. Repetitive description of like elements employed in other embodiments described herein is omitted for sake of brevity.

FIG. 7 illustrates that a locking sleeve 112 comprising one or more third channels 502 (e.g., as shown in FIG. 5) can facilitate the first locked state also shown in FIG. 4. In particular, even when the locking sleeve 112 comprises one or more third channels 502, the locking sleeve 112 can be positioned (e.g., via the one or more actuators 114 and/or the one or more controllers 120) such that the one or more locking pins 132 are located within a first end of the one or more second channels 118. Alternatively, the locking sleeve 112 can be positioned (e.g., via the one or more actuators 114 and/or the one or more controllers 120) such that the one or more locking pins 132 are located within a first end of the one or more third channels 502. The one or more second channels 118 and/or third channels 502 can inhibit the one or more locking pins 132 from traveling along the "Y" axis, thereby inhibiting travel of the locking plate 130 along the "Y" axis and/or compression/extension of the first spring 126 along the "Y" axis. Additionally, when the suspension assembly 100 is in the first locked state and resting, the suspension assembly 100 can be characterized by an overall length "A" indicated by dashed lines in FIG. 7.

Figure 8:
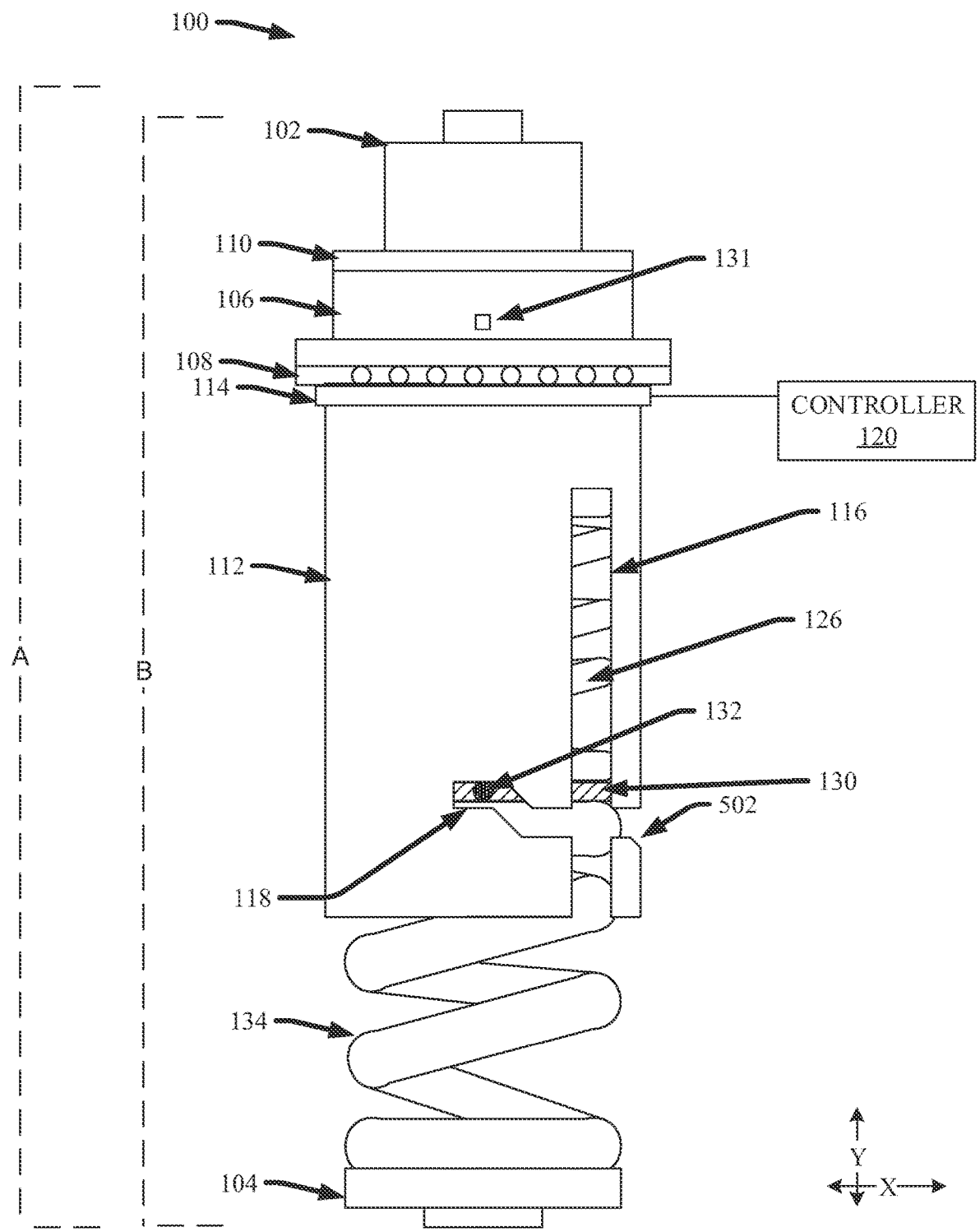
FIG. 8 illustrates a diagram of an example, non-limiting side view of a suspension assembly is a second locked position in accordance with one or more embodiments described herein.

FIG. 8 illustrates a diagram of the example, non-limiting suspension assembly 100 in a second locked state and comprising a locking sleeve 112 that can include the one or more first channels 116, the one or more second channels 118, and/or the one or more third channels 502 in accordance with one or more embodiments described herein. Repetitive description of like elements employed in other embodiments described herein is omitted for sake of brevity.

FIG. 8 illustrates that a locking sleeve 112 comprising one or more third channels 502 (e.g., as shown in FIG. 5) can facilitate a second locked state, which can exhibit different performance characteristics than the first locked state. In particular, even when the locking sleeve 112 comprises one or more third channels 502, the locking sleeve 112 can be positioned (e.g., via the one or more actuators 114 and/or the one or more controllers 120) such that the one or more locking pins 132 are located within a distal second end of the one or more second channels 118. The one or more second channels 118 can inhibit the one or more locking pins 132 from traveling along the "Y" axis, thereby inhibiting travel of the locking plate 130 along the "Y" axis and/or compression/extension of the first spring 126 along the "Y" axis. In other words, similar to the first locked state, the second locked state can disengage the first spring 126 while leaving the second spring 134 operational.

Additionally, since the distal second end of the one or more second channels 118 is at a different position along the "Y" axis than the first end of the one or more second channels 118, the suspension assembly 100 can achieve a different overall length in the second locked state than in the first locked state. In response to being in the second locked state and resting, the suspension assembly 100 can be characterized by an overall length "B" indicated by dashed lines in FIG. 8.

Figure 9:
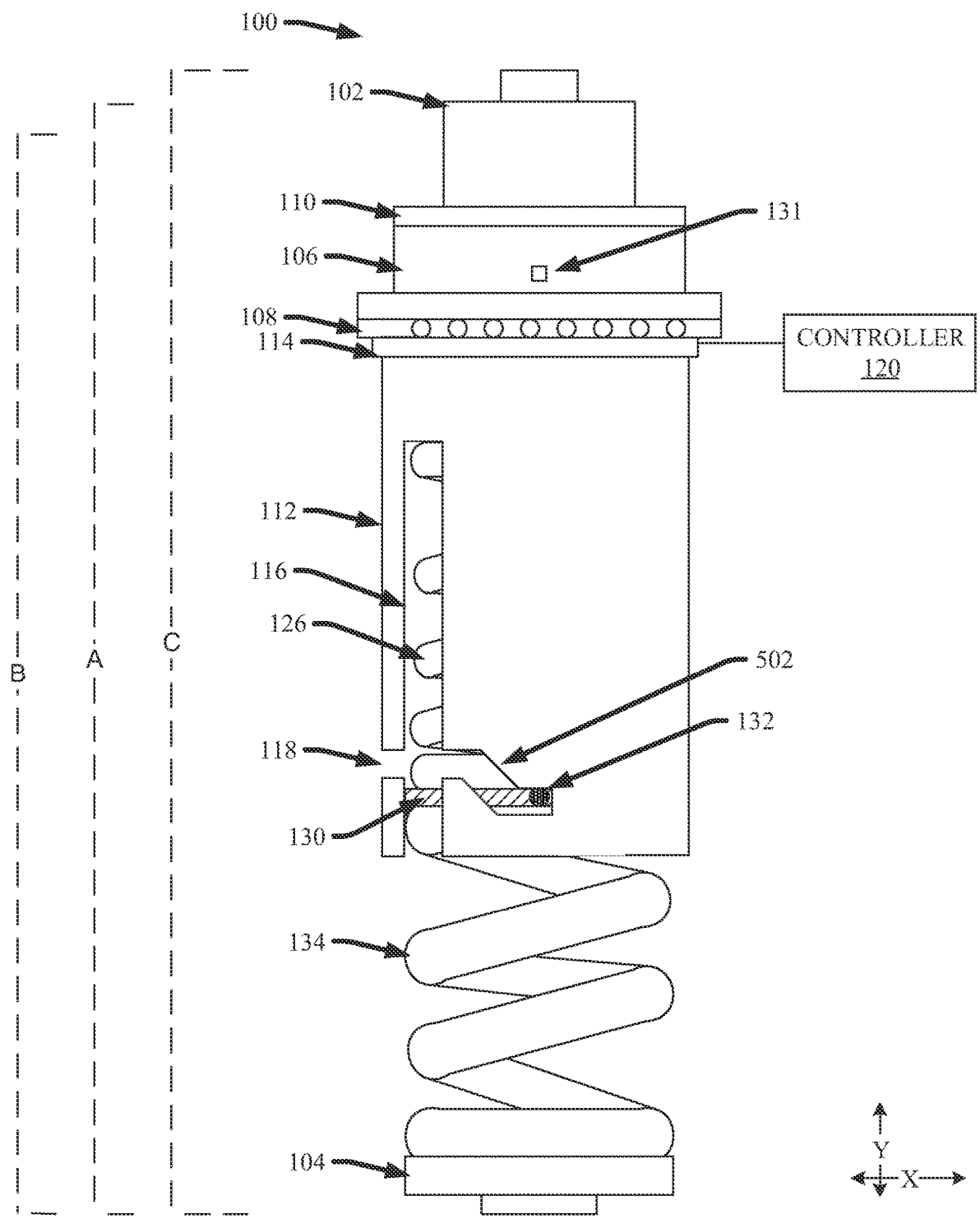
FIG. 9 illustrates a diagram of an example, non-limiting side view of a suspension assembly is a third locked position in accordance with one or more embodiments described herein.

FIG. 9 illustrates a diagram of the example, non-limiting suspension assembly 100 in a third locked state and comprising a locking sleeve 112 that can include the one or more first channels 116, the one or more second channels 118, and/or the one or more third channels 502 in accordance with one or more embodiments described herein. Repetitive description of like elements employed in other embodiments described herein is omitted for sake of brevity.

FIG. 9 illustrates that a locking sleeve 112 comprising one or more third channels 502 (e.g., as shown in FIG. 5) can facilitate a third locked state, which can exhibit different performance characteristics than the first locked state and/or the second locked state. When the locking sleeve 112 comprises one or more third channels 502, the locking sleeve 112 can be positioned (e.g., via the one or more actuators 114 and/or the one or more controllers 120) such that the one or more locking pins 132 are located within a distal second end of the one or more third channels 502. The one or more third channels 502 can inhibit the one or more locking pins 132 from traveling along the "Y" axis, thereby inhibiting travel of the locking plate 130 along the "Y" axis and/or compression/extension of the first spring 126 along the "Y" axis. In other words, like the first locked state and/or the second locked state, the third locked state can disengage the first spring 126 while leaving the second spring 134 operational.

Additionally, since the distal second end of the one or more third channels 502 is at a different position along the "Y" axis than the first end of the one or more second channels 118 and/or third channels 502 and/or the second distal end of the one or more second channels 118, the suspension assembly 100 can achieve a different overall length in the third locked state than in the first locked state and/or the second locked state. In response to being in the third locked state and resting, the suspension assembly 100 can be characterized by an overall length "C" indicated by dashed lines in FIG. 9.

In various embodiments, the first locked state, the second locked state, and/or the third locked state can facilitate different ride heights for a vehicle utilizing the suspension assembly 100. Since the overall length of the suspension assembly 100 can vary depending on the locking state (e.g., the first locked state, the second locked state, and/or the third locked state) the distance between a first mounting point on the vehicle (e.g., where the vehicle is fixed to the first mounting bracket 102) and a second mounting point on the vehicle (e.g., where the vehicle is fixed to the second mounting bracket 104) can also vary. For example, the first mounting point can be on a chassis of the vehicle and the second mounting point can be on and/or near the wheels of the vehicle; thus, a distance between the vehicle's chassis and wheels (e.g., when the vehicle is at rest) can vary as the suspension assembly 100 transitions (e.g., via rotation of the locking sleeve 112) between the first locked state, the second locked state, and/or the third locked state.

In other words, the suspension assembly 100 can be adjusted (e.g., via rotation of the locking sleeve 112) to facilitate different ride heights. As used herein, the term "ride height" can refer to a distance between a vehicle's chassis and the ground. For example, wherein the first locked state facilitates a standard ride height for a subject vehicle, the second locked state can facilitate a lower ride height for the subject vehicle, and/or the third locked state can facilitate a higher ride height for the subject vehicle. For instance, as the locking sleeve rotates between the various locking states, the locking sleeve 112 can be pushed along the "Y" axis (e.g., up or down in the vertical direction); and in response to said movement along the "Y" axis, the adjustment disk 110 can move along the first mounting bracket 102 in the same direction (e.g., via interacting threads). Thus, the first mounting bracket 102 can remain fixed in place while the rest of the suspension can adjust in response to the various locking positions of the locking sleeve 112. In addition to adjusting the overall length of the suspension assembly 100 (e.g., the ride height of a vehicle utilizing the suspension assembly 100), the stiffness of the suspension assembly 100 can also be adjusted (e.g., via rotation of the locking sleeve 112) between the unlocked state and the various locked states due at least to the engagement and/or disengagement of the first spring 126, as described herein.

Figure 10:
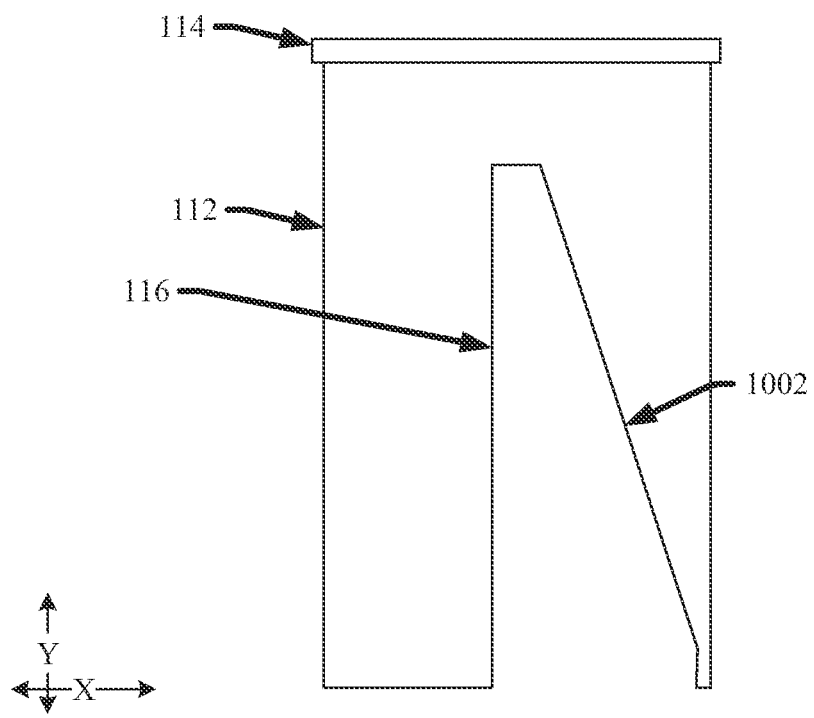
FIG. 10 illustrates a diagram of an example, non-limiting locking sleeve that can be utilized with a suspension assembly in accordance with one or more embodiments described herein.

FIG. 10 illustrates a diagram of an example, non-limiting locking sleeve 112 that can assist the suspension assembly 100 in achieving the unlocked state and/or a plurality of locked states in accordance with one or more embodiments described herein. Repetitive description of like elements employed in other embodiments described herein is omitted for sake of brevity. In one or more embodiments, the locking sleeve 112 can comprise one or more slanted channels 1002 connected to the one or more first channels 116.

As shown in FIG. 10, the one or more slanted channels 1002 can traverse the locking sleeve 112 along both the "Y" axis and the "X" axis in an angled direction. The one or more slanted channels 1002 can extend from the one or more first channels 116 at any point along the compression direction (e.g., along the "Y" axis). For example, the one or more slanted channels 1002 can extend from a distal end of the one or more first channels 116 (e.g., as shown in FIG. 10). Additionally, the one or more slanted channels 1002 can extend to a length greater than, than equal to, or less than the one or more first channels 116.

Figure 11:
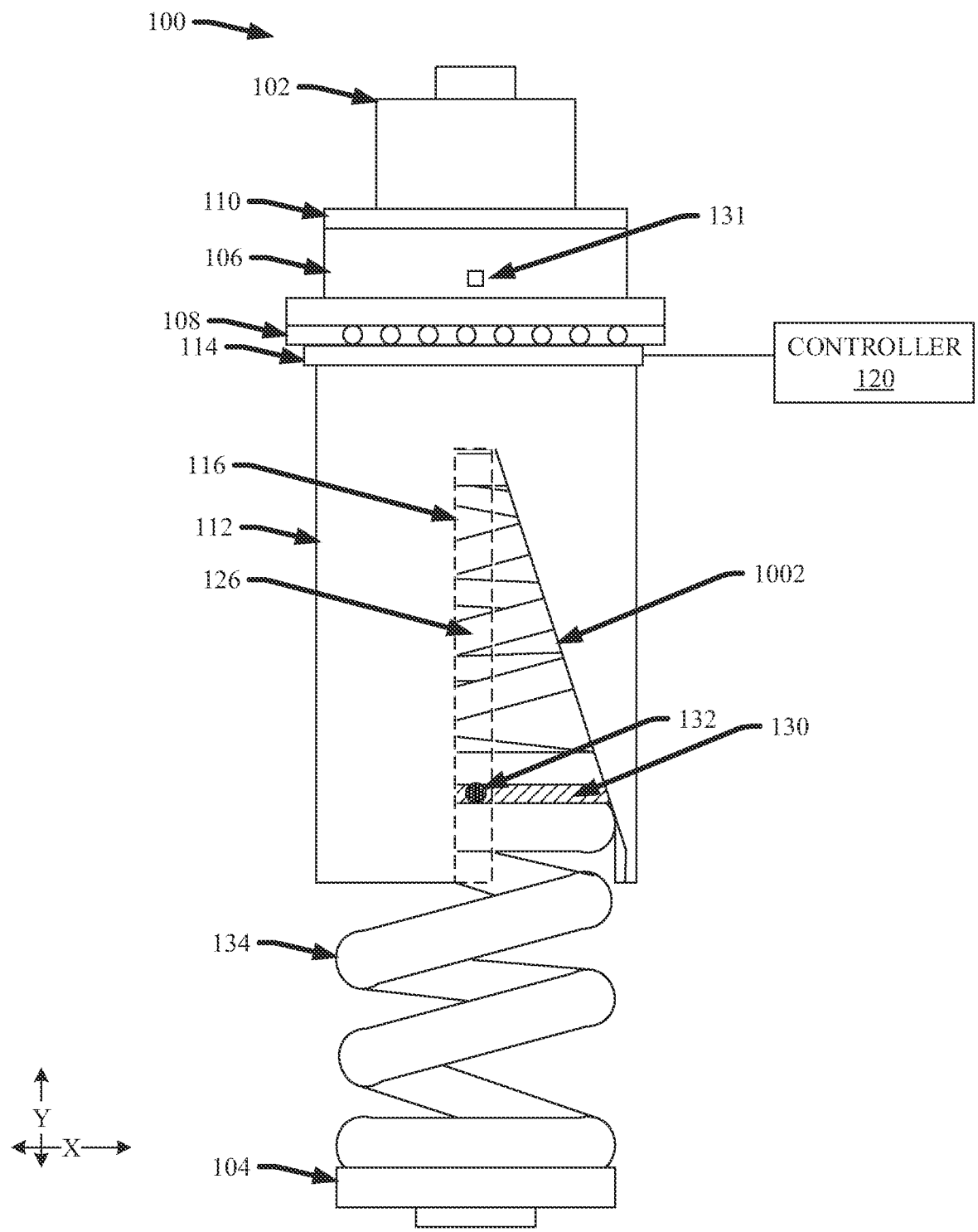
FIG. 11 illustrates a diagram of an example, non-limiting side view of a suspension assembly is an unlocked position in accordance with one or more embodiments described herein.

FIG. 11 illustrates a diagram of the example, non-limiting suspension assembly 100 in the unlocked state and comprising a locking sleeve 112 that can include the one or more first channels 116 and/or the one or more slanted channels 1002 in accordance with one or more embodiments described herein. Repetitive description of like elements employed in other embodiments described herein is omitted for sake of brevity.

As shown in FIG. 11, the one or more first channels 116 are more readily defined by dashed lines. While the suspension assembly 100 is in the unlocked state, the one or more locking pins 132 can be positioned within the one or more first channels 116 (e.g., as shown in FIG. 11). While in the one or more first channels 1106, the one or more locking pins 132 can remain uninhibited from moving along the "Y" axis with the compression and/or decompression of the one or more first springs 126.

Figure 12:
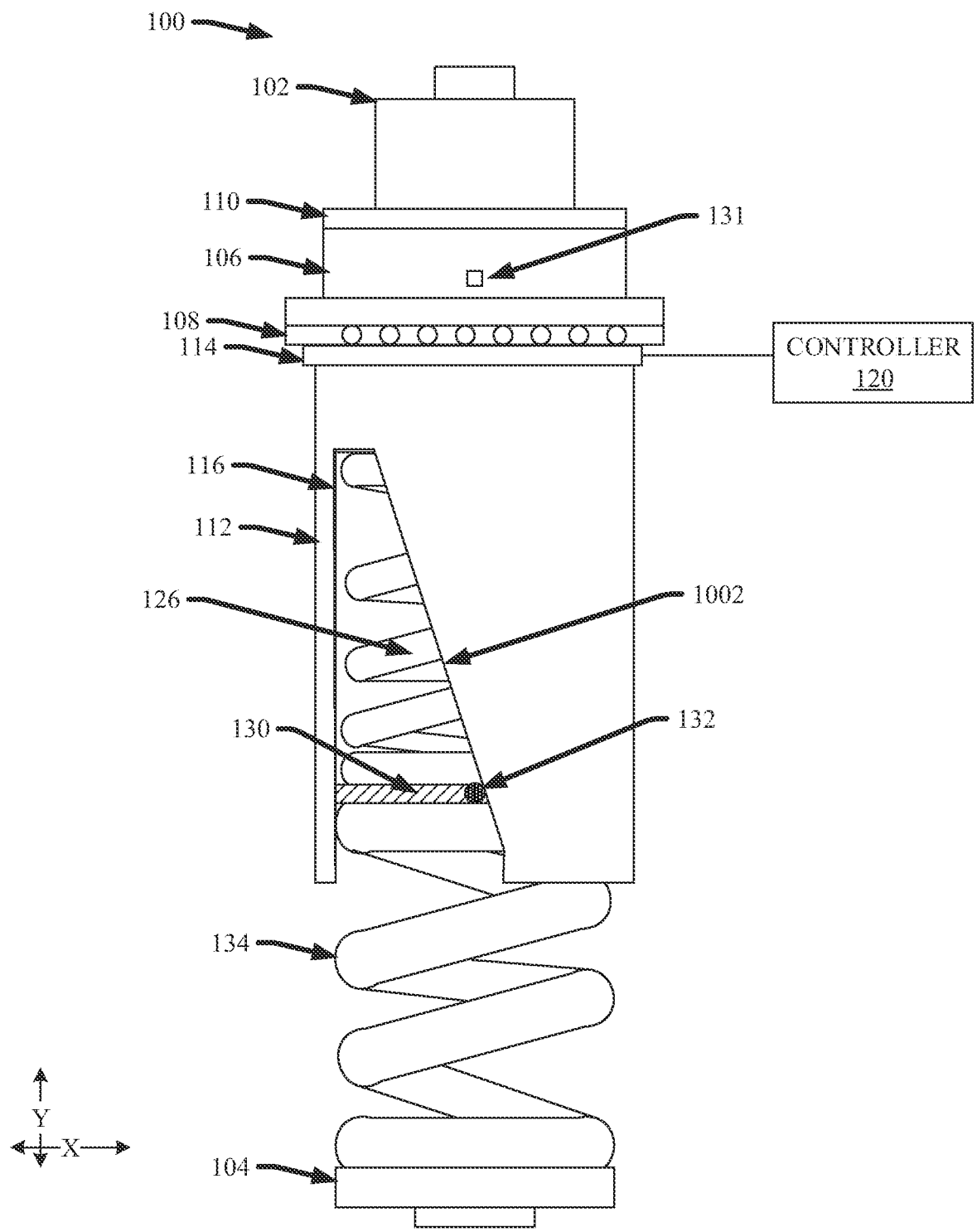
FIG. 12 illustrates a diagram of an example, non-limiting side view of a suspension assembly is a locked position in accordance with one or more embodiments described herein.

FIG. 12 illustrates a diagram of the example, non-limiting suspension assembly 100 in a locked state (e.g., the first locked state, the second locked state, and/or the third locked state) and comprising a locking sleeve 112 that can include the one or more first channels 116 and/or the one or more slanted channels 1002 in accordance with one or more embodiments described herein. Repetitive description of like elements employed in other embodiments described herein is omitted for sake of brevity.

As shown in FIG. 12, while the suspension assembly 100 is one or more locked states, the movement of the one or more locking pins 132 can be inhibited by the one or more slanted channels 1002. For example, the one or more actuators 114 can rotated the locking sleeve 112 to one or more locking positions. Further, the one or more actuators 114 can maintain the locking sleeve 112 in said one or more locking positions. As the locking sleeve 112 rotates, movement of the one or more locking pins 132 can be guided by the one or more slanted channels 1002 rather than the one or more first channels 116. As shown in FIG. 12, the traveling potential of the one or more locking pins 132 along the "Y" axis can be regulated by the one or more slanted channels 1002, wherein the one or more locking pins 132 can experience less traveling potential than that available within the one or more first channels 116. Moreover, the decrease in traveling potential (e.g., as compared to the traveling potential of the one or more locking pins 132 within the one or more first channels 116) can depend on the portion of the one or more slanted channels 1002 corresponding to the one or more locking pins 132 along the "Y" axis. Thus, as the locking sleeve 112 rotates along the "X" axis, the one or more slanted channels 1002 can inhibit the travel potential (e.g., along the compression direction of the first spring 126) to greater degrees. Thereby, the angled configuration of the one or more slanted channels 1002 can facilitate numerous locking positions, and/or ride heights.

In one or more embodiments, the one or more actuators 114 can be operatively coupled to the one or more locking plates 130, rather than the one or more locking sleeves 112. Thereby, the one or more actuators 114 (e.g., in addition to the one or more controllers 120) can facilitate the engagement of locked and/or un-locked positions of the suspension assembly 100 by rotating the one or more locking plates 130 within the locking sleeve 112. In other words, the one or more locking plates 130 can be rotated (e.g., and thereby the one or more locking pins 132 can be rotated), rather than rotating the one or more locking sleeves 112. Relocation of the one or more locking pins 132 between the channels of the one or more locking sleeves 112 can function as described herein whether: the relocation is facilitated by rotating the locking sleeve 112, or the relocation is facilitated by rotating the one or more locking plates 130.

Figure 13:
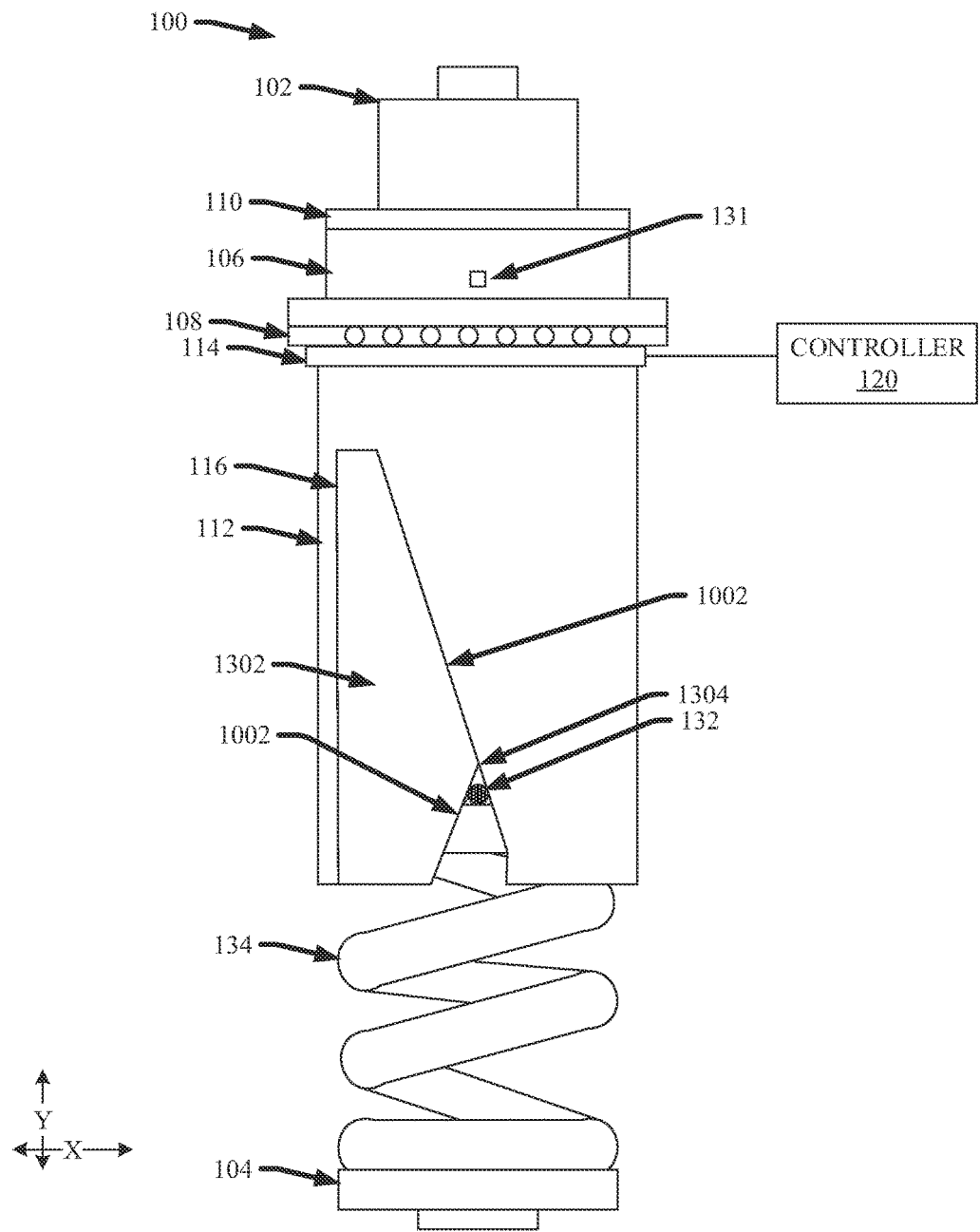
FIG. 13 illustrates a diagram of an example, non-limiting side view of a suspension assembly is a locked position in accordance with one or more embodiments described herein.

FIG. 13 illustrates a diagram of the example, non-limiting suspension assembly 100 in a locked state (e.g., the first locked state, the second locked state, and/or the third locked state) and comprising the one or more locking sleeves 112 and one or more second locking sleeves 1302 in accordance with one or more embodiments described herein. Repetitive description of like elements employed in other embodiments described herein is omitted for sake of brevity.

As shown in FIG. 13, the suspension assembly 100 can comprise one or more second locking sleeves 1302, which can comprise one or more slanted channels 1002. The one or more slanted channels 1002 of the second locking sleeve 1302 can extend in a direction orthogonal to, or substantially orthogonal to, the one or more slanted channels 1002 of the locking sleeve 112. Further, the one or more second lock sleeves 1302 can rotate in an opposite direction than the rotation direction of the locking sleeve 112. In one or more embodiments, the one or more second locking sleeves 1302 can be operatively coupled to the one or more actuators 114 modulating the locking sleeve 112 or one or more other actuators 114 (e.g., one or more other actuators 114 specifically coupled to the one or more second locking sleeves 1302). In various embodiments, the one or more second locking sleeves 1302 can be positioned adjacent to the one or more locking sleeves 112 and/or within the circumference defined by the one or more locking sleeves 1302.

To facilitate transition between the various states (e.g., unlocked states and/or locked states) of the suspension assembly 100 described herein, the one or more second locking sleeves 1302 can rotate to adjust an intersection point 1304 where the path of the one or more slanted channels 1002 of the second locking sleeve 1302 cross the path of the one or more slanted channels 1002 of the locking sleeve 112. As shown in FIG. 13, the intersection point 1304 created by the positioning of the two slanted channels 1002 can define a limit to permissible travel of the one or more locking pins 132 along the "Y" axis. The intersection point 1304 can move along the "Y" axis depending on the rotation of the locking sleeve 112 and/or second locking sleeve 1302; thereby, the amount of permissible travel along the "Y" axis granted to the one or more locking pins 132 can also vary depending on the rotation of the locking sleeve 112 and/or second locking sleeve 1302. In one or more embodiments, the locking sleeve 112 can remain stationary while the second locking sleeve 1302 can rotate to adjust the position of the intersection point 1304 of the slanted channels 1002. Alternatively, in various embodiments, both the locking sleeve 112 and the second locking sleeve 1302 can rotate (e.g., in opposing directions) to adjust the position of the intersection point 1304 of the slanted channels 1002.

FIG. 14A illustrates a flow diagram of an example, non-limiting method 1400 that can regard operation of the suspension assembly 100 in accordance with one or more embodiments described herein. Repetitive description of like elements employed in other embodiments described herein is omitted for sake of brevity.

At 1402, the method 1400 can comprise rotating, by a suspension assembly 100 (e.g., via the one or more actuators 114 and/or the one or more controllers 120), a locking sleeve 112 around a locking plate 130 to inhibit compression of a spring (e.g., first spring 126) that is comprised within the suspension assembly 100. The locking plate 130 can comprise one or more locking pins 132. The locking sleeve 112 can comprise one or more first channels 116 that can traverse the locking sleeve 112 in a compression direction of the spring (e.g., along the "Y" axis). The locking sleeve 112 can further comprise one or more second channels 118 that can be connected to the one or more first channels 116 and can traverse the locking sleeve 112 in a second direction (e.g., along the "X" axis) orthogonal to the compression direction.

At 1404, the method 1400 can also comprise relocating, by the suspension assembly 100 (e.g., via the one or more actuators 114, the locking sleeve 112, and/or the one or more controllers 120), a position of the one or more locking pins 132 relative to the locking sleeve 112 from a first position within the one or more first channels 116 to a second position within the one or more second channels 118.

In various embodiments, the one or more first channels 116 can facilitate compression/extension of the spring (e.g., first spring 126) by guiding the one or more locking pins 132, and thereby the locking plate 130, along the compression direction (e.g., along the "Y" axis). In contrast, the one or more second channels 118 can impede compression/extension of the spring (e.g., first spring 126) by preventing the one or more locking pins 132, and thereby the locking plate 130, from moving along the compression direction (e.g., along the "Y" axis). Thus, the relocating at 1404 can inhibit the compression/extension of the spring (e.g., first spring 126). Further, the relocating at 1404 can be facilitated by the rotating at 1402 (e.g., via the one or more actuators 114 and/or the one or more controllers 120).

Additionally, in one or more embodiments the rotating at 1402 and/or the relocating at 1404 can adjust the base length that can be achieved by the suspension assembly 100. For example, the method 1400 can comprise rotating the locking sleeve 112 to achieve the first locked state, the second locked stated state, and/or the third locked state described herein.

FIG. 14B illustrates a flow diagram of an example, non-limiting method 1406 that can regard operation of the suspension assembly 100 in accordance with one or more embodiments described herein. Repetitive description of like elements employed in other embodiments described herein is omitted for sake of brevity.

At 1408, the method 1406 can comprise rotating, by a suspension assembly 100 (e.g., via the one or more actuators 114 and/or the one or more controllers 120), one or more locking plates 130 within a locking sleeve 112 to inhibit compression of a spring (e.g., first spring 126) that is comprised within the suspension assembly 100. The locking plate 130 can comprise one or more locking pins 132. The locking sleeve 112 can comprise one or more first channels 116 that can traverse the locking sleeve 112 in a compression direction of the spring (e.g., along the "Y" axis). The locking sleeve 112 can further comprise one or more second channels 118 that can be connected to the one or more first channels 116 and can traverse the locking sleeve 112 in a second direction (e.g., along the "X" axis) orthogonal to the compression direction.

At 1410, the method 1406 can also comprise relocating, by the suspension assembly 100 (e.g., via the one or more actuators 114, the locking sleeve 112, and/or the one or more controllers 120), a position of the one or more locking pins 132 relative to the locking sleeve 112 from a first position within the one or more first channels 116 to a second position within the one or more second channels 118.

In various embodiments, the one or more first channels 116 can facilitate compression/extension of the spring (e.g., first spring 126) by guiding the one or more locking pins 132, and thereby the locking plate 130, along the compression direction (e.g., along the "Y" axis). In contrast, the one or more second channels 118 can impede compression/extension of the spring (e.g., first spring 126) by preventing the one or more locking pins 132, and thereby the locking plate 130, from moving along the compression direction (e.g., along the "Y" axis). Thus, the relocating at 1404 can inhibit the compression/extension of the spring (e.g., first spring 126). Further, the relocating at 14010 can be facilitated by the rotating at 1408 (e.g., via the one or more actuators 114 and/or the one or more controllers 120).

Additionally, in one or more embodiments the rotating at 1408 and/or the relocating at 1410 can adjust the maximum possible length that can be achieved by the suspension assembly 100. For example, the method 1406 can comprise rotating the locking sleeve 112 to achieve the first locked state, the second locked stated state, and/or the third locked state described herein In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
    a locking plate located between a first spring and a second spring in a first direction, the locking plate comprises a locking pin; and
    a locking sleeve positioned adjacent to the first spring and configured to rotate in relation to the first spring, the locking sleeve comprising a first channel oriented in the first direction and a second channel oriented in a second direction.

2. The apparatus of claim 1, wherein the locking pin is positioned between the first spring and the second spring and extends from a side of the locking plate.

3. The apparatus of claim 1, wherein the first direction is slanted in relation to the first direction, and wherein second channel extends from the first channel.

4. The apparatus of claim 1, wherein the locking pin is located within the first channel based on the apparatus being in an unlocked position, and wherein the locking pin is located within the second channel based on the apparatus being in a locked position.

5. The apparatus of claim 4, wherein the first spring is configured to be compressible along the first direction based on the apparatus being in the unlocked position, wherein compression of the first spring is inhibited along the first direction based on the apparatus being in the locked position, and wherein the compressibility of the second spring remains unchanged in the locked position as compared to the unlocked position.

6. The apparatus of claim 5, wherein the first spring has a first spring rate, wherein the second spring has a second spring rate, and wherein the first spring rate is different than the second spring rate.

7. The apparatus of claim 1, wherein the first channel is comprised within a plurality of first channels, wherein the plurality of first channels traverse the locking sleeve in the first direction, wherein the second channel is comprised within a plurality of second channels, and wherein the plurality of second channels connect to respective first channels from the plurality of first channels.

8. The apparatus of claim 7, wherein the plurality of second channels traverse the locking sleeve in the second direction.

9. The apparatus of claim 1, further comprising a third channel that is connected to the first channel and traverses the locking sleeve in the second direction.

10. The apparatus of claim 9, wherein the locking pin is located within the first channel based on the apparatus being in an unlocked position, wherein the locking pin is located within the second channel based on the apparatus being in a first locked position, and wherein the locking pin is located within the third channel based on the apparatus being in a second locked position.

11. A system, comprising:
a locking plate located between a first spring and a second spring, the locking plate comprising a locking pin;
a locking sleeve that is operatively coupled to an actuator, wherein the locking sleeve is positioned adjacent to the first spring and configured to rotate in relation to the first spring;
a first channel that traverses the locking sleeve in a compression direction of the first spring; and
a second channel that traverses the locking sleeve in a second direction, wherein the first channel is connected to the second channel.

12. The system of claim 11, wherein the system is in an unlocked state based on the locking pin being positioned within the first channel, and wherein the system is in a locked state based on the locking pin being positioned within the second channel.

13. The system of claim 12, wherein the first spring is configured to be compressible along the compression direction based on the system being in the unlocked state, and wherein compression of the first spring is inhibited along the compression direction based on the system being in the locked state.

14. The system of claim 13, wherein the first spring has a first spring rate, wherein the second spring has a second spring rate, and wherein the first spring rate is different than the second spring rate.

15. The system of claim 14, wherein the locking pin is positioned between the first spring and second spring and extends from a side of the locking plate.

16. The system of claim 11, wherein the first channel is comprised within a plurality of first channels, wherein the plurality of first channels traverse the locking sleeve in the compression direction, wherein the second channel is comprised within a plurality of second channels, and wherein the plurality of second channels connect to respective first channels from the plurality of first channels.

17. A method, comprising:
relocating a position of a locking pin relative to a locking sleeve to inhibit compression of a spring that is comprised within a suspension assembly, wherein the locking sleeve comprises a first channel that traverses the locking sleeve along a compression direction of the spring and a second channel that is connected to the first channel and traverses the locking sleeve in a second direction, and wherein the relocating comprises moving the locking pin from a first position within the first channel to a second position within the second channel by rotating the locking sleeve in relation to the first spring.

18. The method of claim 17, wherein the suspension assembly is in an unlocked state based on the locking pin being in the first position, and wherein the suspension assembly is in a locked state based on the locking pin being in the second position.

19. The method of claim 17, wherein the locking sleeve further comprises a third channel that is connected to the first channel and traverses the locking sleeve in the second direction, and wherein the second position is within the second channel or the third channel.

20. The method of claim 19, wherein the locking pin is positioned between the first spring and the second spring and extends from a side of the locking plate.

\* \* \* \* \*